455/12

United States Patent [19]

Sommer

[11] 3,806,653

[45] Apr. 23, 1974

[54] REPEATER AND METHOD FOR ASYNCHRONOUS MULTIPLEX COMMUNICATION SYSTEM

[75] Inventor: Robert C. Sommer, Alexandria, Va.

[73] Assignee: Company Sciences Corp., Los Angeles, Calif.

[22] Filed: Sept. 22, 1970

[21] Appl. No.: 74,360

[52] U.S. Cl. ............ 179/15 FE, 325/4, 179/15 BA

[51] Int. Cl. ............ H04j 1/10

[58] Field of Search ... 325/4, 3; 179/15 AD, 15 BL, 179/15 BY, 15 BA

[56] References Cited

UNITED STATES PATENTS 3,710,255 1/1973 Gicca ............ 325/4

3,300,782 1/1967 Margerum ............ 325/4 X

*Primary Examiner*—Maynard R. Wilbur

*Assistant Examiner*—H. A. Birmiel

*Attorney, Agent, or Firm*—Browne, Beveridge, DeGrandi & Kline

[57] ABSTRACT

There is disclosed a repeater in which asynchronously transmitted signals of selected nominal carrier frequencies, isolated from each other and within a common band, are envelope detected and applied to a threshold device which converts all signals above a certain threshold to a standard amplitude. The output signals of such threshold devices have 180° phase reversal applied thereto, are amplified and then the signals are recombined for re-transmission to various receiving stations.

8 Claims, 2 Drawing Figures

PATENTED APR 23 1974 3,806,653

INVENTOR
ROBERT C. SOMMER

BY Beveridge & De Grandi

ATTORNEYS

REPEATER AND METHOD FOR ASYNCHRONOUS MULTIPLEX COMMUNICATION SYSTEM

BACKGROUND AND BRIEF DESCRIPTION OF THE INVENTION

There have been disclosed in the prior art a number of nonsynchronous multiplex communication systems wherein the various transmitters for the stations are not coupled or controlled by any transmission schedule but rather are independent of one another except that such transmitters transmit signals which uniquely identifies the station receiver for which the transmitter signals are designated. For example, the pulses from the transmitter may be transmitted under code or with variable pulse rates, or some other identifying indicia. Examples of such nonsynchronous systems are disclosed in Shroeder, U.S. Pat. No. 3,160,711, Pierce U.S. Pat. No. 2,719,188, Blasbalg U.S. Pat. No. 3,432,619 and Lindner U.S. Pat. No. 3,025,350, these listed patents being examples of the prior art. The present invention is concerned primarily with the repeater station in such system. Such repeater station may be on an earth orbiting satelite or may be a part of another communication system, as for example a mobile repeater station which is not necessarily a satellite communications system. However, the invention will be described in connection with a satellite communication system.

The purpose of asynchronous multiplexing is to provide communication between several transmitters and their companion receivers without having to establish some organized transmission format among the transmitters such as frequency division multiplexing and/or time division multiplexing. With asynchronous multiplexing, all transmissions occupy the same frequency band simultaneously and any desired signal can be recovered from the totality of received signals by appropriate coding/decoding procedures. By this elimination of requirement for synchronism amongst the various transmitters, geographical constraints among the stations are minimal and it is only necessary that all transmitters have access to the common transmitting medium. Moreover, asynchronous multiplexing techniques are not vulnerable to an overload as is time division multiplexing when all time slots are filled. Instead, asynchronous multiplexing techniques are characterized by a "graceful degradation" whereby the system performance (as measured by error rate or output signal-to-noise ratio) gradually degrades as more transmitters become active. The several operational advantages which accrue through asynchronous operation cannot be realized without some cost. A significant measure of cost is the total system bandwidth which is required to reliably transmit at some prescribed total system data rate. By means of information theory, it can be shown that frequency and/or time division multiplexing techniques require about 70 percent of the bandwidth which is required to reliably transmit at some prescribed total system data rate. Therefore, the theoretical cost of asynchronous operation is about a 30 percent reduction in total system data rate which is required to enable the separation of a desired signal from the totality of received signals.

It is with respect to the repeater of such a system that the present invention is concerned and to which the present description will be directed. In accordance with a preferred aspect of the invention, the output signals of such a repeater are phase reversal keyed in order to provide the greatest noise immunity in the repeater-to transceiver link. This provides advantageous handling of large number of stations of relatively small capacity including mobile users for either commercial or military communication systems. Moreover, no power control or system of timing is required of the up-link signals that arrive at the repeater in order to guarantee efficient down link power utilization, e.g., good efficiency and utilization of bandwidth is achieved, and a phase coherent down-link is realizable with its corresponding energy efficiency, even with asynchronous on-off keyed up-link signals.

BRIEF DESCRIPTION OF THE DRAWINGS

Referring now to FIG. 1 of the drawings, there is shown a simplified block diagram of a typical satelite communication system in which an earth orbiting satellite 10 contains a repeater circuitry 11. The satellite repeater comprises the following components which are coupled to produce a repeater amplifier consistently with the presently known art: A receiver antenna 13, a receiver mixer 14, a local oscillator 15, a signal 16 (which is the subject of this invention and is disclosed in greater detail in FIG. 2), other amplifying elements, not shown, and a transmitting antenna 18. The receiving and transmitting antennae 13 and 18, respectively, are shown as two separate units but one skilled in the art can obviously combine them into an integrated unit, if desired. A plurality of ground stations S1, S2, S3 . . . SN are shown, each of which transmits, in an asynchronous fashion, to the repeater assembly contained within satelite 10 in which all the transmissions from the various station transmissions occupy the same frequency bands simultaneously but wherein the signals are appropriately time-frequency addressed from the multiplicity of asynchronously operated transmitters at stations S1, S2, S3 . . . SN.

Referring now to FIG. 2, there is shown a block diagram of the repeater signal processing unit contained within processer 16 shown in FIG. 1. The input shown is comprised of a plurality of pulses having nominal carrier frequencies of F1'', F2'', . . . , FN'. A local oscillator or fixed frequency source 20 drives a converter 21 which beats the input pulses down to a convenient set of nominal carrier frequencies of F'1, F'2, . . . , F'N. It will be appreciated that this function may be performed at mixer 14 and local oscillator 15.

Figure 1:
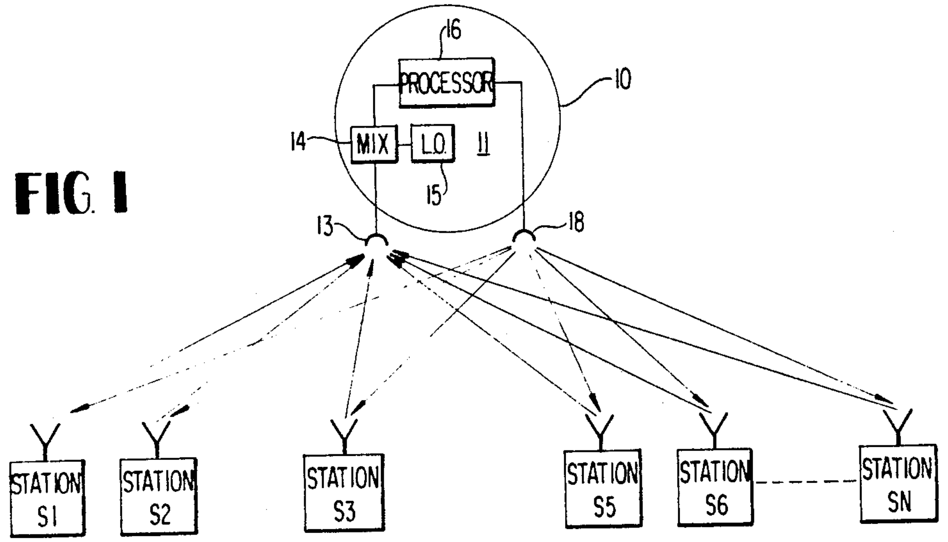
FIG. 1 is a diagrammatic block diagram of a communication system incorporating a repeater wherein the repeater is on an earth-orbiting satellite.
Figure 2:
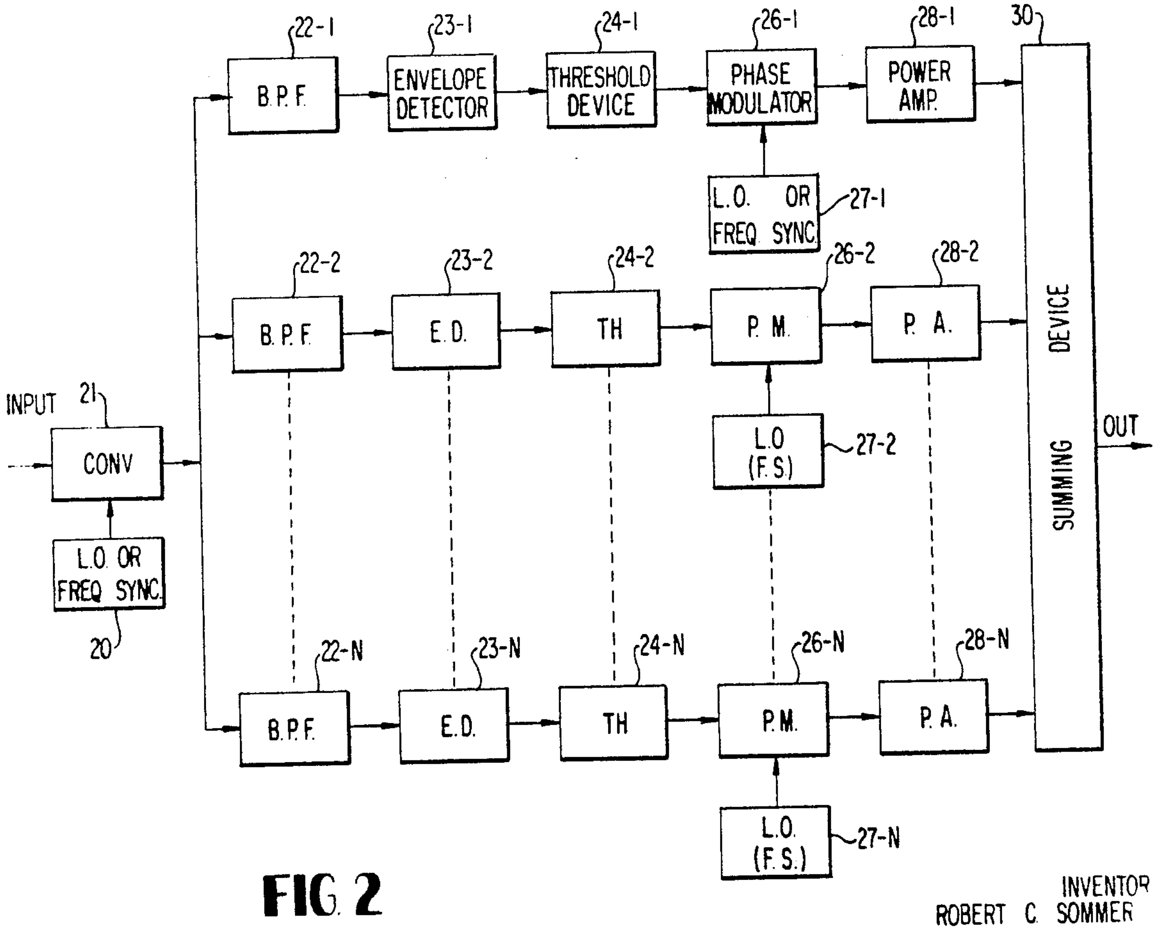
FIG. 2 is a block diagram of the processing circuit shown in the repeater of FIG. 1.

These signals are then applied to a plurality ($N$) of band pass filters 22–1, 22–2, . . . 22–N centered at the center of frequencies of the nominal carrier frequencies referenced above and these filters are used to isolate or channelize those pulses which belong in each of the addressed channels, respectively.

The output of each channelizing filter 22 is envelope detected in envelope detectors 23–1, 23–2, . . . 23–N, and the output of each envelope detector is presented to a threshold device 24–1, 24–2 . . . 24–N, respectively. When the input from a given envelope detector 23 to its given threshold device 24 exceeds the threshold level, the output of that device is a voltage of a standard amplitude which persists until the input voltage no longer exceeds the threshold level at which time the output drops to zero. Such devices are well known in the art and need not be described in detail (they may, for example, be Schmitt trigger circuits). Each threshold device 24 is followed by a phase modulator 26–1, which is supplied also with a second input from a local oscillator or source 27–1, and in like manner the remaining outputs of the threshold detectors 24 are applied to their associated phase modulators 26–2, . . . 26–N, respectively. The phase modulators 26 introduce a phase reversal (180° phase shift) upon receiving a voltage of standard amplitude from its respective threshold device.

The signals which then become phase modulated are at frequencies F1, F2, . . . FN are generated by a bank of local oscillators or sources (as, for example, a frequency synthesizer may be used to generate all the frequencies used so they would be integrally related). In some situations, as a practical matter, each local oscillator may be followed by a multiplier chain (not shown). Each phase modulator drives a power amplifier 28–1, 28–2, . . . 28–N, the outputs of which are applied to a summing device 30 which produces the output signal. This signal may be further amplified, if desired, and transmitted via transmitter antenna 18. Reception at the various stations is accomplished by phase locking N local oscillators or sources at frequencies F1, F2, . . . FN.

While the invention has been disclosed in one preferred embodiment, and typed application, it will be appreciated that many variations will become apparent to those skilled in the art.

What is claimed is:

1. In a method of processing signals in an asynchronously multiplexed radio communication system wherein a plurality of stations communicate via a common repeater, said repeater having means for isolating signals from each of said stations and amplifying same for re-transmission, said method including the step of reversing the phase of each said signals above a selected threshold level, respectively.

2. The invention defined in claim 1 wherein each said signal above a threshold level is amplified and then summed with other signals above the threshold level, each said signal having its phase reversed prior to amplification.

3. A method of processing asynchronously multiplexed signals from a plurlaity of stations in a repeater common to all said stations, comprising translating the frequencies of all received signals, envelope detecting each of said signals, passing those envelope detected signals which are above a selected level, using each detected signal above said selected level to generate a signal for re-transmission, respectively, and combining the signals so generated and transmitting same.

4. The invention defined in claim 3 including the step of reversing the phase of each of said generated signals.

5. Repeater apparatus for use in an asynchronous multiplex communication system comprising, in combination, means for receiving the signals from a plurality of stations, means for channelizing said received signals from each of said stations, means for envelope detecting said received signals, threshold means for passing only those signals which are above a selected level and producing an output voltage of a standard amplitude for each received signal which is above said threshold level, and for only as long as said signal remains above said threshold level, and a zero output voltage at other times, means associated with each of said signals introducing a phase reversal upon receiving a voltage from said threshold means, and means for summing said phase reversed signals and transmitting same from said repeater to said stations.

6. The invention defined in claim 5, wherein said means for introducing a phase reversal includes a phase modulator and means supplying each said phase modulator with a selected frequency, respectively, whereby said phase reversal is applied to said selected frequency, respectively.

7. The invention defined in claim 6 wherein each said selected frequency is integrally related to the other of said selected frequencies.

8. The invention defined in claim 6 wherein the output of each said phase modulator is at 180° phase relative to the phase of said selected frequency, respectively, and including amplification means for each said phase reversed signal, respectively.

* * * * *

PO-1050
(5/69)

UNITED STATES PATENT OFFICE
CERTIFICATE OF CORRECTION

Patent No. 3,806,653 Dated April 23, 1974

Inventor(s) ROBERT C. SOMMER

It is certified that error appears in the above-identified patent and that said Letters Patent are hereby corrected as shown below:

The name of the assignor should read

--COMPUTER SCIENCES CORPORATION--

Signed and sealed this 17th day of September 1974.

(SEAL)
Attest:

McCOY M. GIBSON JR.
Attesting Officer

C. MARSHALL DANN
Commissioner of Patents